(12) United States Patent
Kong

(10) Patent No.: US 8,789,867 B2
(45) Date of Patent: Jul. 29, 2014

(54) CUP HOLDER OF CONSOLE BOX FOR VEHICLE

(75) Inventor: Byung Seok Kong, Whasung-Si (KR)

(73) Assignees: Hyundai Motors Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/408,504

(22) Filed: Feb. 29, 2012

(65) Prior Publication Data

US 2013/0112831 A1 May 9, 2013

(30) Foreign Application Priority Data

Nov. 3, 2011 (KR) .................. 10-2011-0113816

(51) Int. Cl.
*B60N 3/10* (2006.01)
(52) U.S. Cl.
USPC .............. 296/24.34; 296/37.8; 248/311.2; 224/282; 224/926
(58) Field of Classification Search
CPC ........ B60N 3/102; B60N 3/105; B60N 3/106; B60N 3/108
USPC ............. 248/311.2, 27.1, 27.3; 224/282, 926; 296/24.34, 37.8, 37.12, 37.13
See application file for complete search history.

(56) References Cited

U.S. PATENT DOCUMENTS

| | | | | |
|---|---|---|---|---|
| 5,248,183 A | * | 9/1993 | Gignac et al. ............. | 297/188.16 |
| 5,280,848 A | * | 1/1994 | Moore ............................ | 224/282 |
| 5,516,016 A | * | 5/1996 | Anderson et al. ............. | 224/282 |
| 5,890,692 A | * | 4/1999 | Lee et al. ................... | 248/311.2 |
| 6,085,953 A | * | 7/2000 | Bober et al. .................. | 224/282 |
| 6,513,687 B1 | * | 2/2003 | Siniarski ....................... | 224/282 |
| 6,547,326 B1 | * | 4/2003 | Walkinshaw et al. ..... | 297/188.01 |
| 6,655,563 B2 | * | 12/2003 | Shimajiri ..................... | 224/282 |
| 6,692,053 B1 | * | 2/2004 | Smith .......................... | 296/37.1 |
| 6,808,097 B2 | * | 10/2004 | Kim et al. .................. | 224/483 |
| 6,932,311 B2 | * | 8/2005 | DeVries et al. ............ | 248/311.2 |
| 7,025,316 B2 | * | 4/2006 | Schaal ....................... | 248/311.2 |
| 7,140,660 B2 | * | 11/2006 | Oana ........................... | 296/37.8 |
| 7,520,405 B2 | * | 4/2009 | Ishida et al. ................. | 220/737 |
| 7,568,749 B2 | * | 8/2009 | Biggs et al. .................. | 296/37.8 |
| 2003/0029878 A1 | | 2/2003 | Peitzmeier et al. | |
| 2007/0013202 A1 | * | 1/2007 | Tompson .................... | 296/37.1 |
| 2007/0278372 A1 | * | 12/2007 | Okada et al. ............... | 248/311.2 |
| 2009/0039126 A1 | * | 2/2009 | Yamagishi et al. ........... | 224/281 |
| 2009/0302628 A1 | * | 12/2009 | Cinco .......................... | 296/37.1 |
| 2010/0314896 A1 | * | 12/2010 | Skibinski et al. ........... | 296/24.34 |
| 2011/0215606 A1 | * | 9/2011 | Trivedi ....................... | 296/24.34 |
| 2013/0112831 A1 | * | 5/2013 | Kong ........................ | 248/311.2 |

FOREIGN PATENT DOCUMENTS

| | | |
|---|---|---|
| JP | 8-99576 A | 4/1996 |
| JP | 2010-6186 A | 1/2010 |
| KR | 10-0666569 B1 | 1/2007 |

* cited by examiner

*Primary Examiner* — Charles A Fox
*Assistant Examiner* — Guang H Guan
(74) *Attorney, Agent, or Firm* — Morgan, Lewis & Bockius LLP

(57) ABSTRACT

A cup holder apparatus of a console box for a vehicle, which may be installed at the rear of a console armrest in a rotatably opening and closing manner, may include left and right side portions pivotally coupled to the rear of the console armrest and elastically supported by an elastic member and forming a storage space therebetween for storing a container, wherein the left and right side portions may be selectively inserted into spaces formed at both left and right sides of an armrest hinge assembly when the cup holder may be closed by the elastic member.

3 Claims, 15 Drawing Sheets

(a) Present invention (b) Comparative example

CUP HOLDER OF CONSOLE BOX FOR VEHICLE

CROSS-REFERENCE TO RELATED APPLICATION

The present application claims priority to Korean Patent Application No. 10-2011-0113816 filed Nov. 3, 2011, the entire contents of which are incorporated herein for all purposes by this reference.

BACKGROUND

1. Field of the Invention

The present invention relates to a console box for a vehicle. More particularly, it relates to a cup holder of a console box for a vehicle, which is installed at the rear of the console box such that a rear seat passenger can place a container such as a cup, etc., in the cup holder.

2. Description of Related Art

In general, various convenient facilities are provided in the interior of a vehicle for the convenience of a driver and a passenger. The convenient facilities typically include a console box in which various articles are stored, an armrest on which a user's arm is placed, a cup holder in which a drink container such as a can, bottle, cup, etc., is stored.

Among them, the console box is installed between a driver's seat and a front passenger's seat to provide a storage space in which various documents and tools required for driving are stored, and a console armrest on which the driver can rest his or her arm during driving is typically provided on the console box.

The console armrest supports the driver's elbow to assist the driver to drive while seated in a comfortable position and is installed at the top of the console box to cover the storage space of the console box.

Here, the rear end of the console armrest is hinge-connected to an upper rear of the console box such that the console armrest can be rotated up and down with respect to a hinge connection portion at the rear end when the storage space of the console box is opened and closed.

Moreover, a typical cup holder is installed on an instrument panel in front of the driver's seat and the front passenger's seat, on a tray in front of the console box between the driver's seat and the front passenger's seat, etc., such that the driver and the front passenger can store various drink containers such as cans, bottles, cups, etc.

Meanwhile, a rear cup holder provided to be used by a rear seat passenger is installed on the back of a front seat, on a door trim, or on the back of the console box.

Among them, a conventional cup holder installed on the back of the console box is shown in FIGS. 1 and 2.

As shown in the figures, a cup holder 11 is installed on the back a console box 10 to the rear of a console armrest 13.

Here, a lower end of the cup holder 11 is hinge-connected to a rear end of the console box 10 such that the cup holder 11 is rotated with respect to a hinge connection portion 12 with the console box 10, and thus the storage space is opened and closed.

During use, the rear seat passenger rotates the cup holder 11 downward (in the clockwise direction in the figures) with respect to the hinge connection portion 12 such that the cup holder 11 is opened backward from the back of the console box 10 and then places a drink container 1 in the storage space of the cup holder 11.

However, the above-described conventional cup holder has the following problems.

The cup holder 11 is disposed at the rear of the console armrest 13 on the console box 10 and, as shown in FIG. 2, the entire cup holder 11 is located at the rear of the hinge connection portion 12 of the console armrest 13 regardless of opened and closed states (the position of the hinge connection portion of the console armrest is labeled "B" in FIG. 2).

In this conventional structure, the console box 10 should extend backward to provide the installation space and storage space of the cup holder 11 and, as a result, the console box 10 and the cup holder 11 protrude excessively from the back of the front seat (i.e., the driver's seat and the front passenger's seat) to the rear.

In particular, when the cup holder 11 being located at the rear of the hinge connection portion of the console armrest 13 is not used, the entire cup holder 11 should be pushed into the rear space of the console box 10, and thus the console box 10 itself should protrude significantly from the back of the front seat.

Moreover, since the cup holder 11 is drawn backward during use, the cup holder 11 protrudes further to the rear (i.e., the distance between the cup holder and the rear seat is further reduced), and thus the rear seat passenger's legs are restrained by the cup holder 11, thereby significantly reducing the comfort of the passenger.

As such, when the console box 10 and the cup holder 11 protrude excessively from the back of the front seat, the convenience and comfort of the rear seat passenger may be reduced.

Moreover, during use, the cup holder 11 should ensure a sufficient height, and thus the region "A" of FIG. 2 should be elongated in the conventional structure. Given the position of the hinge connection portion of the console armrest, if the region "A" is elongated, the amount of backward protrusion of the console box 10 and the cup holder should be further increased.

Furthermore, when the utilization of the rear seat is high and the smoking rate at the rear seat is high, a container 1 such as a cup, portable ashtray, etc., is frequently placed in the cup holder 11, and thus the excessive protrusion of the console box 10 and the cup holder 11 may make the passenger feel inconvenient, which needs to be improved.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a cup holder of a console box for a vehicle, which is configured such that the amount of backward protrusion of the console box and the cup holder is reduced, thereby improving the convenience and comfort of a rear seat passenger and the merchantability of the vehicle.

In one aspect, a cup holder apparatus of a console box for a vehicle, which is installed at the rear of a console armrest in a rotatably opening and closing manner, may include left and right side portions pivotally coupled to the rear of the console armrest and elastically supported by an elastic member and forming a storage space therebetween for storing a container, wherein the left and right side portions are selectively inserted into spaces formed at both left and right sides of an armrest hinge assembly when the cup holder is closed by the elastic member.

The cup holder apparatus may include a flap pivotally and elastically coupled to a rear portion of the cup holder and supporting the stored container.

The cup holder apparatus may include a holder receiving groove, formed on the rear of the console box such that the cup holder is inserted and removably fitted thereto when the cup holder is closed, and recessed portions formed in the holder receiving groove in both sides thereof such that the both left and right side portions are selectively inserted thereto.

The cup holder apparatus may include a flap pivotally and elastically coupled to a rear portion of the cup holder and supporting the stored container.

The cup holder apparatus may include a flap spring installed on a hinge connection portion of the flap and the cup holder to provide an elastic restoring force to the flap for rotating the flap upward with respect to the hinge connection portion, and a hooked portion formed on the rear portion of the cup holder and by which the flap is hooked to restrict an upward rotation of the flap.

The cup holder apparatus may include a container support portion protruding from the holder receiving groove of the console box and supporting the stored container, wherein the flap is automatically folded by the elastic member while a front end of the flap is in contact with the container support portion when the cup holder is closed by the elastic member.

The direction of a contact surface of the container support portion and the shape of the front end of the flap are designed such that a contact repulsive force, which is a force in a direction perpendicular to the contact surface of the container support portion with which the front end of the flap is in contact when the flap is in contact with the container support portion, is applied as a rotational moment in a direction that the flap is folded in a state where the flap is hooked by the hooked portion on the rear portion.

The elastic member provides an elastic restoring force for rotating the cup holder toward the console armrest in a closing direction such that the flap is automatically folded when the cup holder is automatically closed by the elastic restoring force of the elastic member.

The following formula is satisfied such that the cup holder can be automatically closed and the flap is automatically folded Formula $K_f \times \theta_f < K_c \times \theta_c$ where $K_f$ represents a spring constant of the flap spring, $K_c$ represents a spring constant of the elastic member, $\theta_c$ represents a rotation angle of the cup holder from a state where the flap is initially in contact with the container support portion to a state where the cup holder is completely closed, and $\theta_f$ represents a rotation angle of the flap from a state where the flap is initially in contact with the container support portion to a state where the cup holder is completely closed.

Other aspects and exemplary embodiments of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
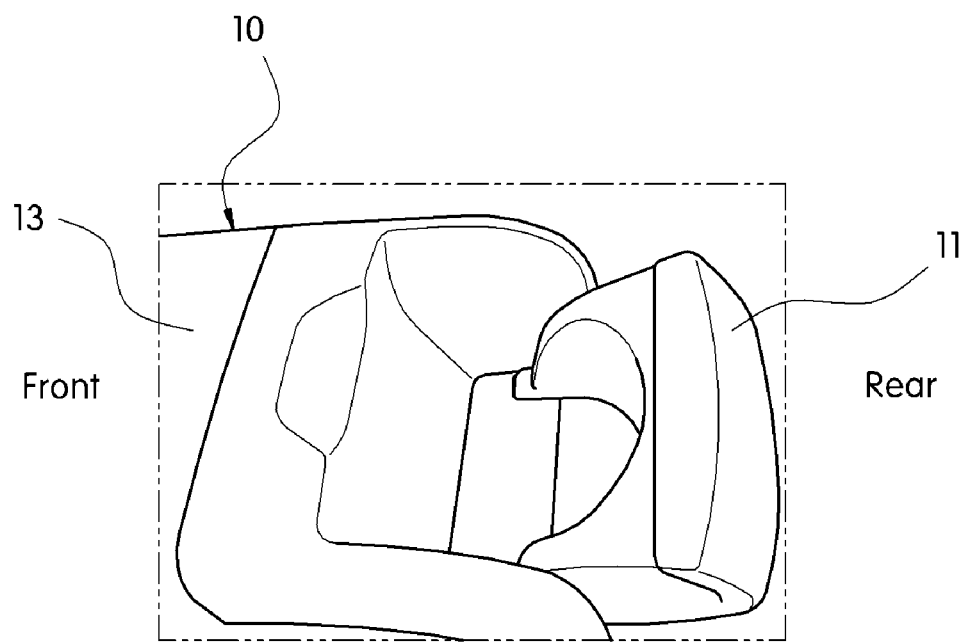
FIG. 1 is a perspective view showing a state in which a cup holder of a console box in accordance with a prior art is opened.
Figure 2:
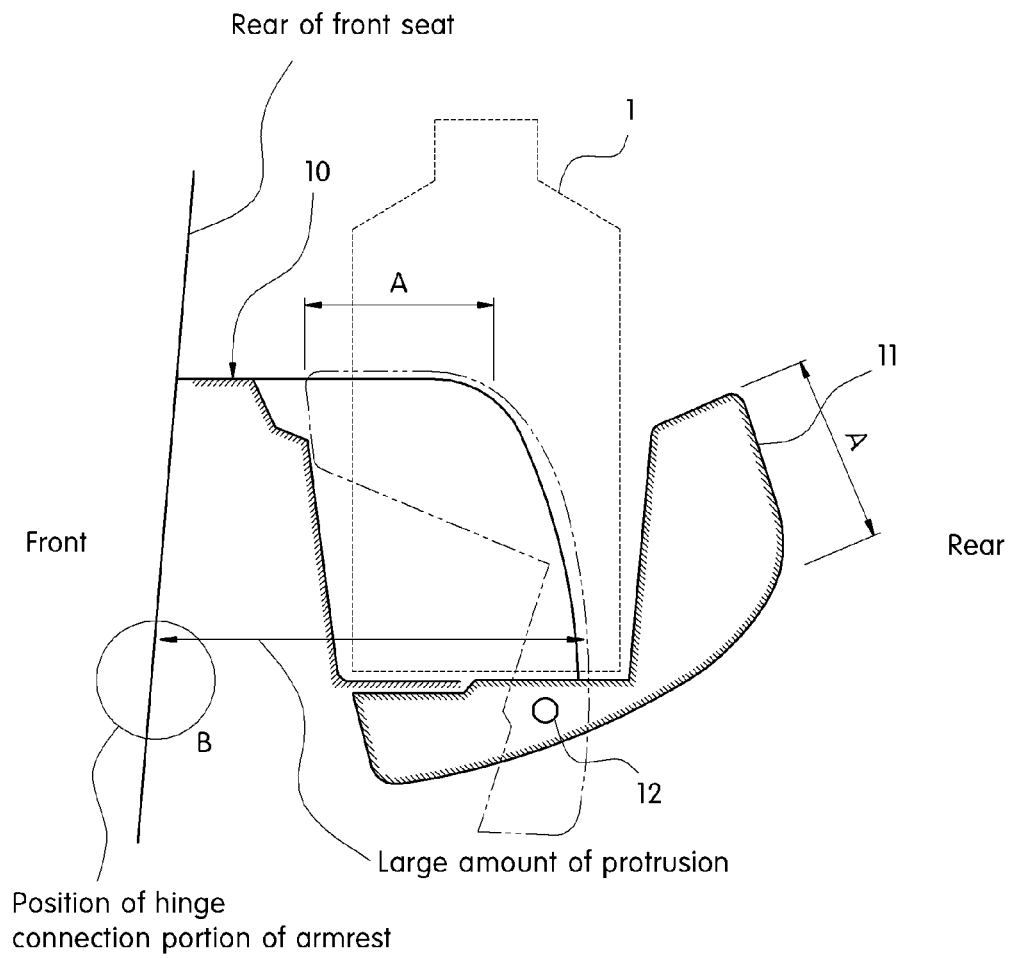
FIG. 2 is a cross-sectional view showing the problems of the cup holder in accordance with the prior art.

Reference numerals set forth in the Drawings includes reference to the following elements as further discussed below:

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

The present invention provides a cup holder of a console box for a vehicle, which is installed at the rear of the console box to accommodate various containers such as a cup, can, bottle, portable ashtray, etc.

Figure 3:
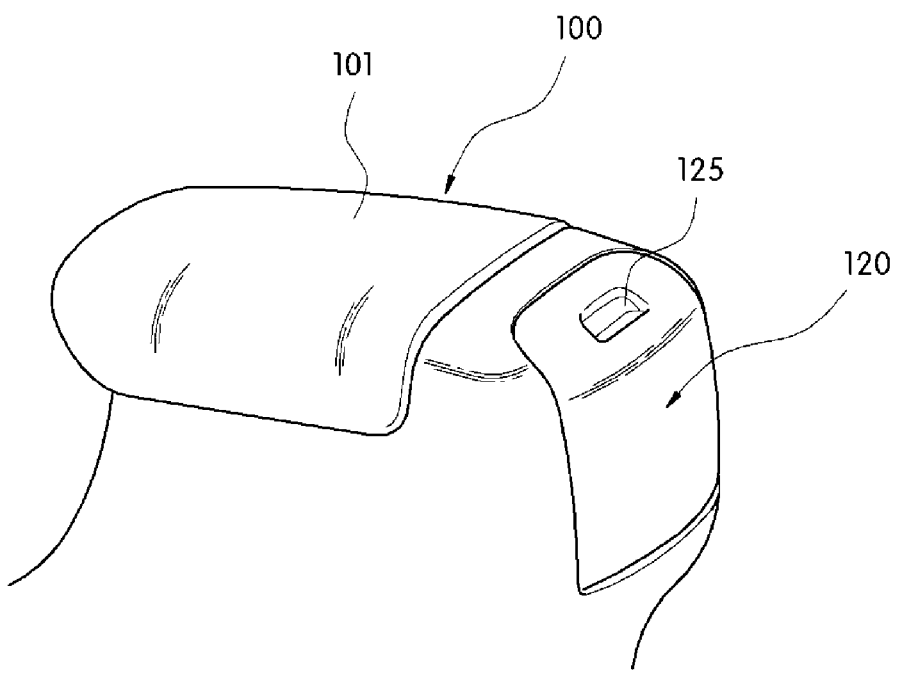
FIG. 3 is a perspective view showing a state in which a cup holder in accordance with the present invention is installed.

FIG. 3 is a perspective view showing a state in which a cup holder 120 in accordance with the present invention is installed, in which the cup holder 120 is being closed.

Figure 4:
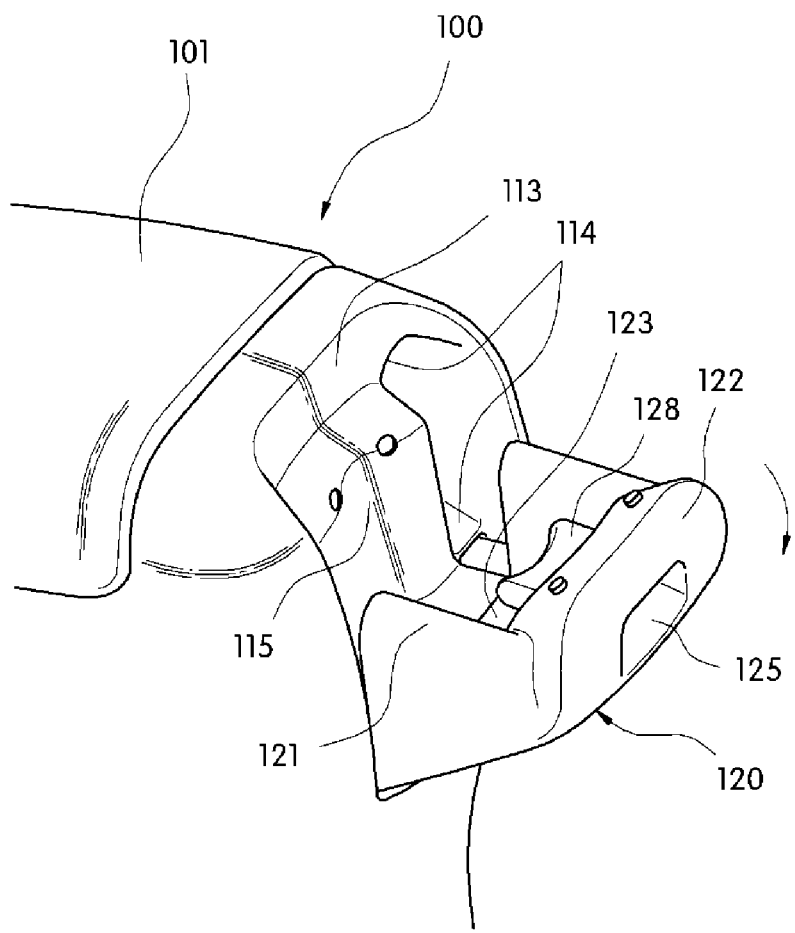
FIG. 4 is a perspective view showing a state in which the cup holder in accordance with the present invention is drawn and opened.

FIG. 4 is a perspective view showing a state in which the cup holder 120 is drawn and opened in which the cup holder 120 is opened by holding a handle 125 and rotating the cup holder 120 downward (e.g., a rotatable opening and closing type).

Figure 5:
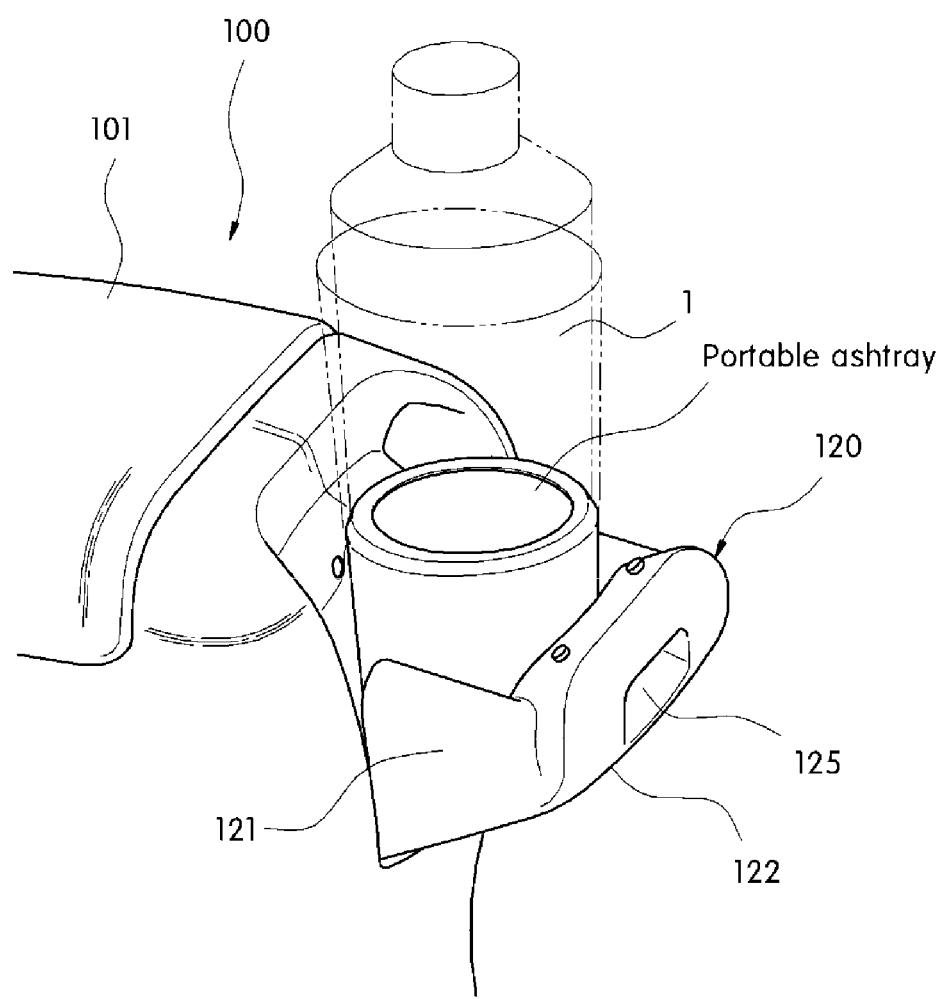
FIG. 5 is a perspective view showing a state in which a container is placed in the cup holder in accordance with the present invention.

FIG. 5 shows a state in which, after the cup holder 120 is opened, a container 1 such as a cup, drink bottle, portable ashtray, etc., is stored in its storage space.

Figure 6:
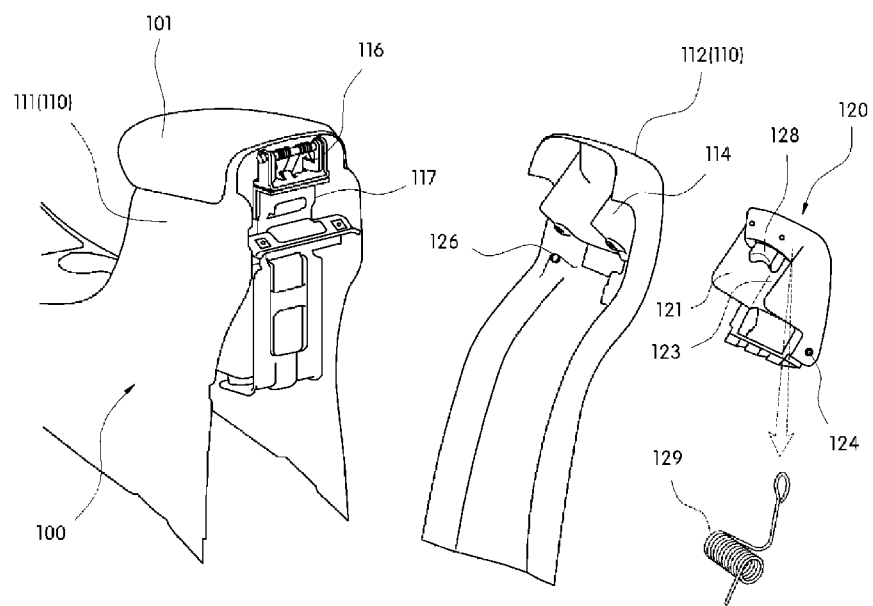
FIG. 6 is an exploded perspective view showing the cup holder in accordance with the present invention.
Figure 7:
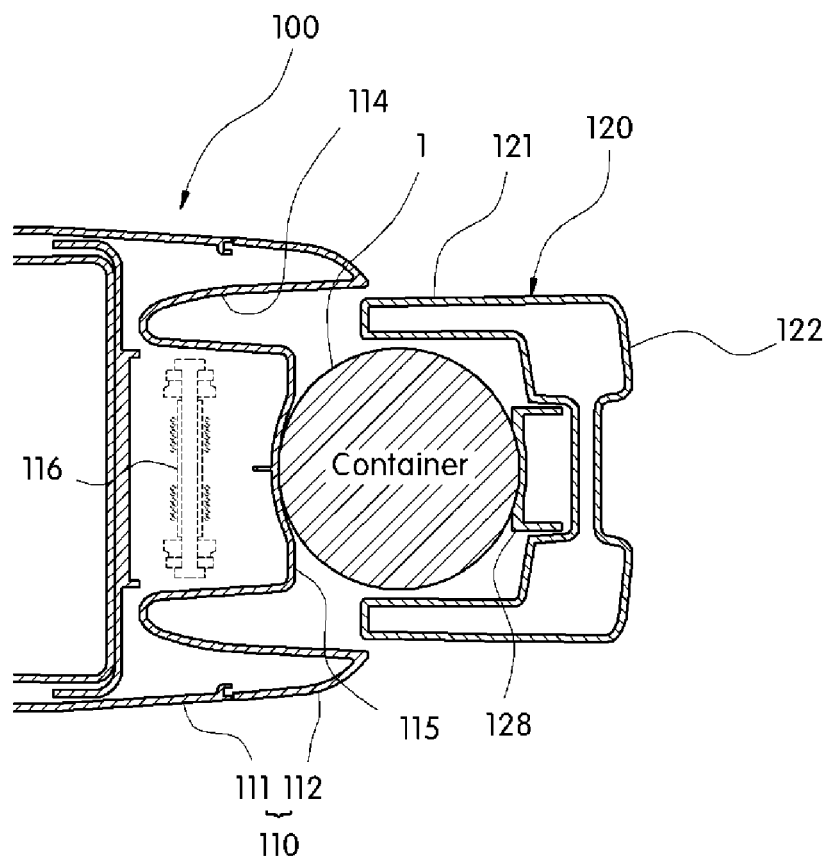
FIG. 7 is a cross-sectional view showing a state in which a container is placed in the cup holder in accordance with the present invention.
Figure 8:
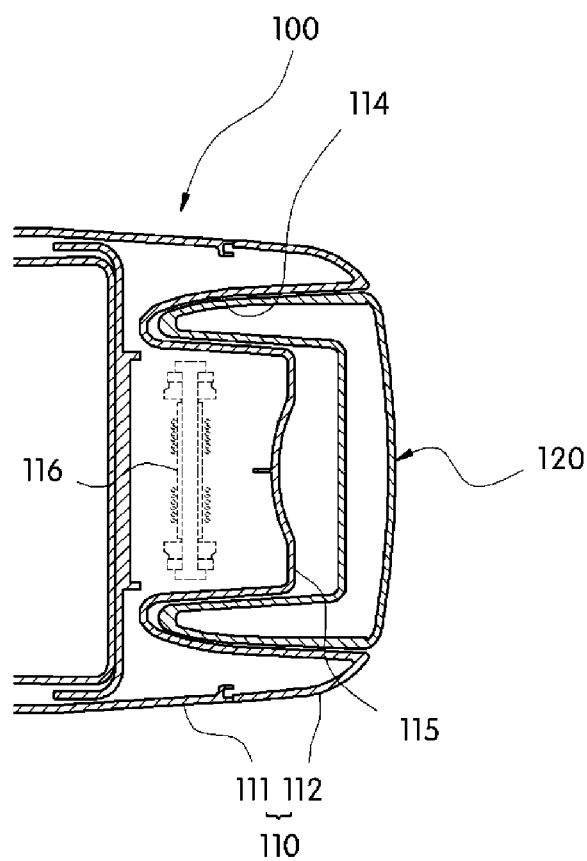
FIG. 8 is a cross-sectional view showing a state in which the cup holder in accordance with the present invention is closed.
Figure 9:
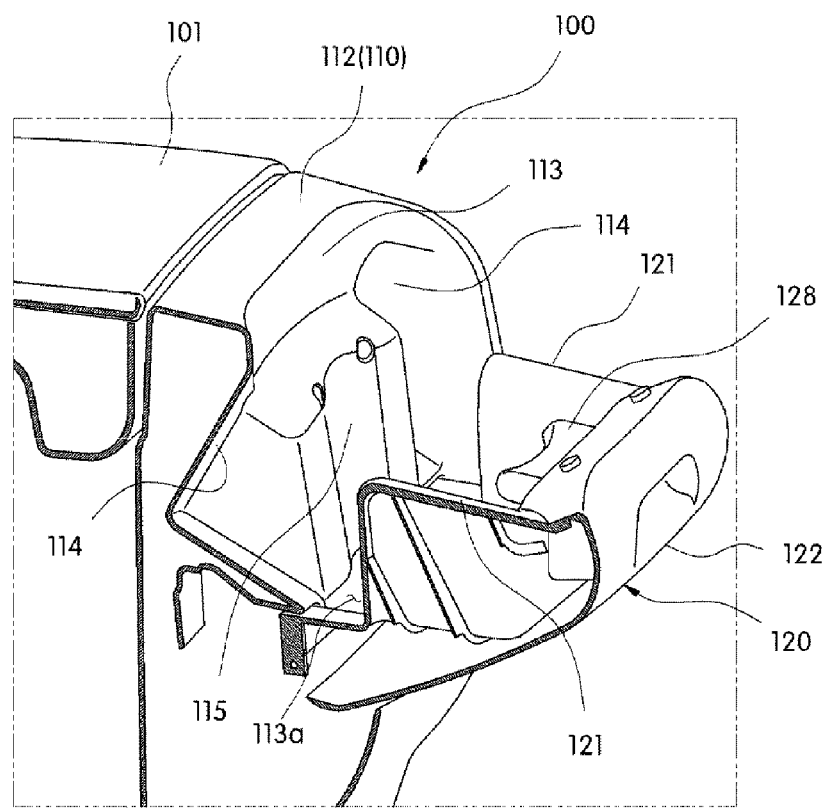
FIG. 9 is a cross-sectional perspective view showing a state in which the cup holder in accordance with the present invention is drawn and opened.
Figure 10:
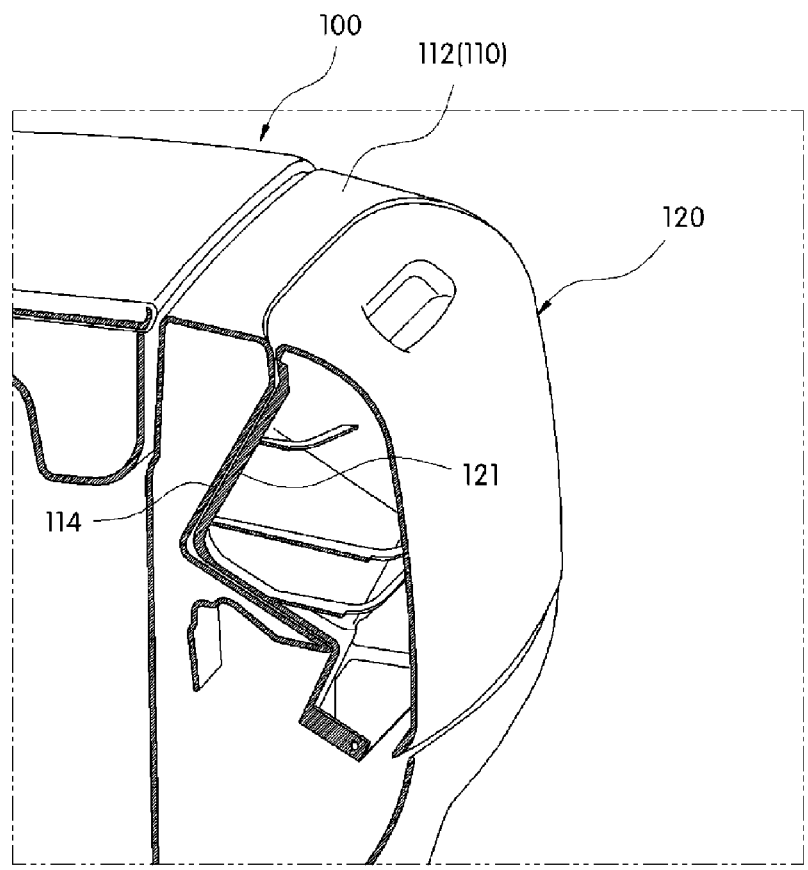
FIG. 10 is a cross-sectional perspective view showing a state in which the cup holder in accordance with the present invention is closed.

Moreover, FIG. 6 is an exploded perspective view showing the cup holder 120, FIG. 7 is a cross-sectional view showing a state in which the container 1 is placed in the cup holder 120, FIG. 8 is a cross-sectional view showing a state in which the cup holder 120 is closed, FIG. 9 is a cross-sectional perspective view showing a state in which the cup holder 120 is drawn and opened, and FIG. 10 is a cross-sectional perspective view showing a state in which the cup holder 120 is closed.

As shown in the figures, the cup holder 120 of the present invention is installed to be rotated up and down with respect to a hinge connection portion (denoted by reference numeral 124 in FIG. 6) at the bottom of the rear end of the console box 100, and the lower end of the cup holder 120 is hinge-connected to a rear end (more clearly, to a rear housing 112 to be described later) of a housing (denoted by reference numeral 110 in FIG. 6) of the console box 100.

Therefore, when the cup holder 120 is pulled backward and drawn, the cup holder 120 is rotated downward, and thus its storage space is exposed to the outside, that is, the cup holder 120 is being opened (see FIG. 4).

On the contrary, when the cup holder 120 is pushed forward to be rotated upward, the storage space is closed, and the outer side of the cup holder 120 matches the rear of the console box 100. As a result, the cup holder 120 is not exposed to the outside, that is, the cup holder 120 is being closed (see FIG. 3).

The cup holder 120 of the present invention has a structure in which both left and right side portions 121, a rear portion 122, and a bottom portion 123 form the storage space in which the container 1 is stored.

Further, a holder receiving groove 113, to which the cup holder 120 is inserted and connected during non-use, is provided at the rear of the console box 100.

During use, the cup holder 120 is tilted backward, and then the cup holder 120 and its storage space protrude to the rear of the console box 100 such that the storage space is created on the outside of the rear of the console box 100 (see FIGS. 4, 7 and 9). During non-use, the storage space is closed, and the cup holder 120 is connected to the holder receiving groove 113 of the console box 100 (see FIGS. 3, 8 and 10).

Moreover, the both left and right side portions 121 and the rear portion 122 of the cup holder 120 have a predetermined height for supporting the container 1. Thus, the cup holder 120 of the present invention has a structure in which the both left and right side portions 121 are inserted into unused spaces at both sides of an armrest hinge assembly 116 and a rear support bracket 117 when the cup holder 120 is closed.

FIG. 6 shows the armrest hinge assembly 116, which is installed between the rear end of the console armrest 101 and the rear of a main body housing 111 of the console box 100 and acts as the center of rotation when the console armrest 101 is opened and closed, and the rear support bracket 117 which is fixedly installed on the rear of the main body housing 111 to firmly support the armrest hinge assembly 116 and to enhance the stiffness of the armrest hinge assembly 116.

In this configuration, the rear housing 112 is assembled to the rear of the main body housing 111 of the console box 100, and the cup holder 120 is assembled to an upper end of the rear housing 112 to be rotated up and down (e.g., a rotatable opening and closing type).

The upper end of the rear housing 112 is located at the rear of the console armrest 101, forms a space in which the cup holder 120 is put when the cup holder 120 is closed, and forms the holder receiving groove 113 in which the side of the container 1 placed in the cup holder 120 is put.

When the cup holder 120 is being opened, a bottom surface 113a of the holder receiving groove 113 and a bottom surface 123 of the cup holder 120 form a support surface for supporting the bottom of the container 1 placed in the cup holder 120. When the cup holder 120 is being completely opened, the bottom surface 113a of the holder receiving groove 113 and the bottom surface 123 of the cup holder 120 form the same plane, thereby forming the support surface on which the container 1 is placed.

Moreover, recessed portions 114 disposed at both left and right sides of the armrest hinge assembly 116 and the rear support bracket 117 are provided in the holder receiving groove 113. The both side portions 121 of the cup holder 120 are inserted into the recessed portions 114.

As such, the recessed portions 114, into which the both left and right side portions 121 of the cup holder 120 are inserted when the cup holder 120 is closed, are provided in the holder receiving groove 113 formed on the rear of the console box 100, more clearly, at the upper end of the rear housing 112, and thus the both left and right side portions 121 of the cup holder 120 can be inserted into the unused spaces of the console box 100 (i.e., the unused spaces at both sides of the armrest hinge assembly 116 and the rear support bracket 117). As a result, the amount of backward protrusion of the console box 100 and the amount of backward protrusion of the cup holder 120 due to the installation of the cup holder 120 can be significantly reduced.

Referring to FIGS. 4, 7 and 9, it can be seen that, when the container 1 is placed in the cup holder 120, the both left and right side portions 121 of the cup holder 120 are completely disengaged from the recessed portions 114 and located on the outside of the rear housing 112 of the console box 100.

On the contrary, referring to FIGS. 8 and 10, it can be seen that the cup holder 120 is being closed, while the both left and right side portions 121 of the cup holder 120 are being inserted into the recessed portions 114, and the sides of the cup holder 120 completely match the rear of the rear housing 112 of the console box 100 without protruding to the rear.

As such, with the structure in which the storage space is created when the cup holder 120 is drawn and the structure in which the both left and right side portions 121 of the cup holder 120 supporting the container 1 are inserted into the unused spaces of the housing 110 of the console box 100, i.e., into the recessed portions 114 located at both sides of the armrest hinge assembly 116 and the rear support bracket 117, the amount of backward protrusion of the cup holder 120 according to an exemplary embodiment of the present invention can be minimized.

Moreover, a holder spring 126 is mounted in the hinge connection portion 124 of the cup holder 120 with respect to the rear housing 112 of the console box 100 such that its elastic restoring force is applied in a direction that cup holder 120 is closed.

That is, when a user removes the container 1 from the cup holder 120, the elastic restoring force of the holder spring 126 acts as a force that closes the cup holder 120, and thus the cup holder 120 is automatically closed by the elastic restoring force of the holder spring 126, thereby providing convenience of operation.

Of course, when the container 1 is placed in the cup holder 120, the user should draw the cup holder 120, which is inserted into the holder receiving groove 113 of the console box 100 and closed, with a force greater than the spring force of the holder spring 126.

Meanwhile, a container support portion 115 for supporting one side of the container 1 is formed to protrude from the inner side of the holder receiving groove 113, and the inner side of the container support portion 115 is formed with a curved surface having a predetermined curvature.

Moreover, a flap 128 for closely supporting the other side of the container 1 in a position corresponding to the container support portion 115 is elastically and rotatably provided on the inner side of the cup holder 120. After the cup holder 120 is drawn, the container 1 is inserted between the container support portion 115 on the inner side of the holder receiving groove 113 and the flap 128 (which is automatically rotated upward when the cup holder 120 is opened).

As such, when the container 1 is inserted between the container support portion 115 and the flap 128, the opened state of the cup holder 120 can be maintained by the inserted container 1 even when the elastic restoring force of the holder spring 126 is applied to the cup holder 120.

Figure 11:
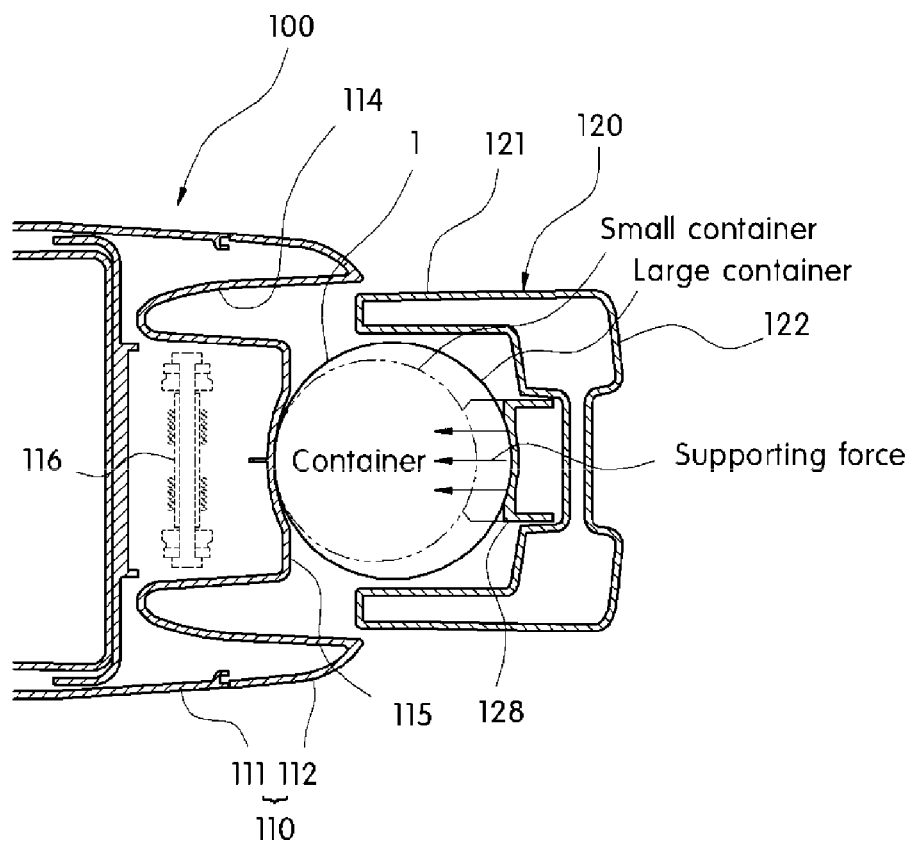
FIG. 11 is a cross-sectional view showing a state in which a supporting force of a flap is applied to the cup holder in accordance with the present invention.
Figure 12:
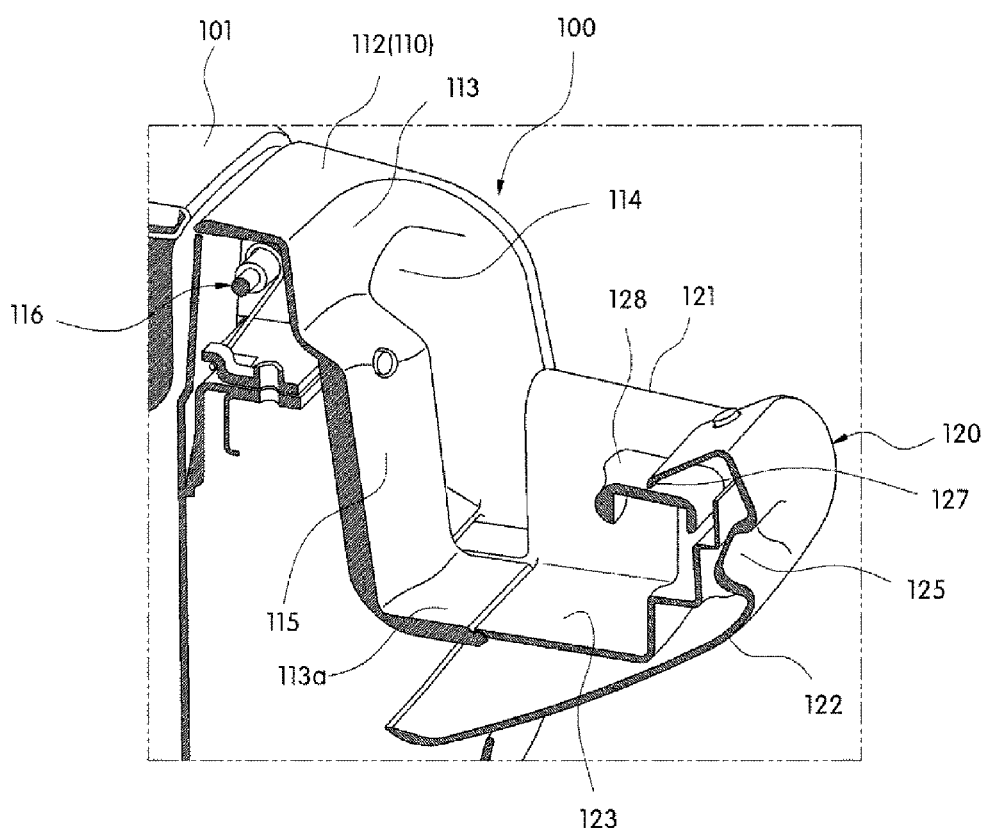
FIGS. 12 and 13 are cross-sectional perspective views taken with respect to the position of the flap in the cup holder in accordance with the present invention.
Figure 13:
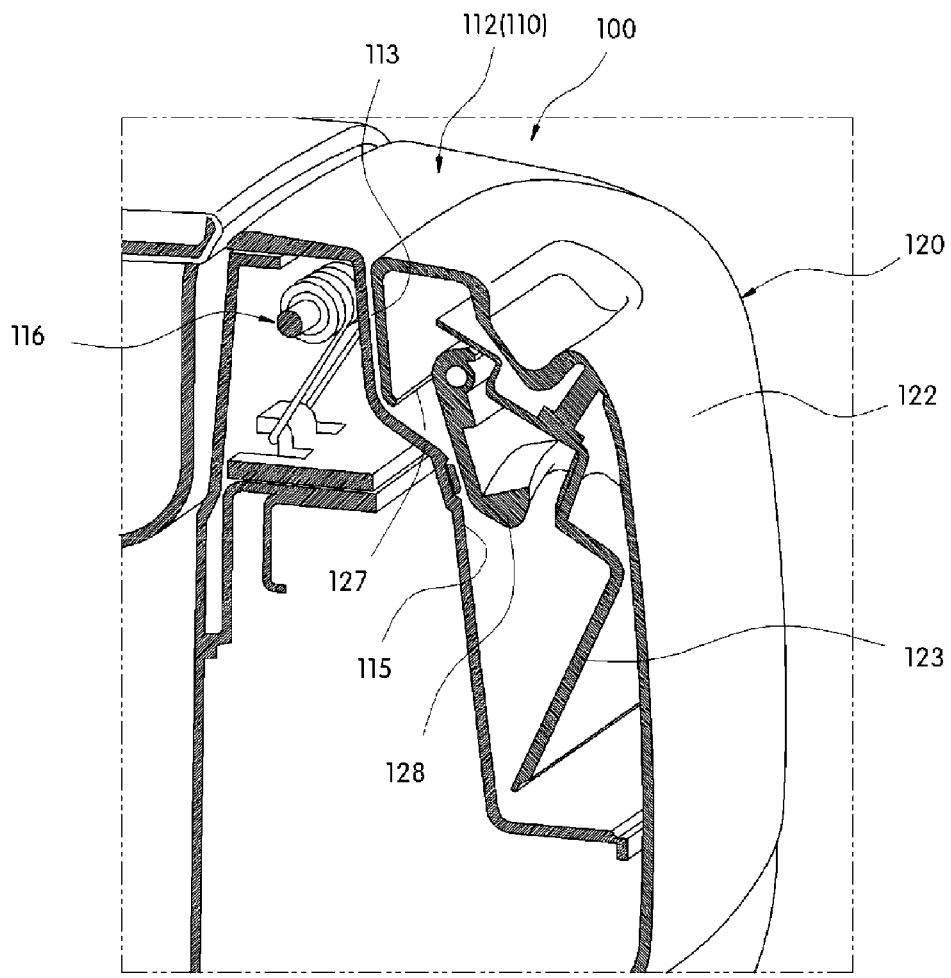

FIG. 11 is a cross-sectional view showing a state in which the supporting force of the flap 128 is applied to the cup holder 120 in accordance with the present invention, and FIGS. 12 and 13 are cross-sectional perspective views taken with respect to the position of the flap 128 in the cup holder 120 in accordance with the present invention.

The height of the rear portion 122 of the cup holder 120 according to an exemplary embodiment of the present invention, required to support the container 1, is closely related to the amount of protruding. That is, when the cup holder 120 is being opened, the higher the height of the rear portion 122 of the cup holder 120 required to stably support the container 1 (to prevent the container 1 from falling during sudden acceleration or during sudden stop), the more the amount of backward protrusion of the cup holder 120 increases.

Therefore, there are limitations in increasing the height of the rear portion 122 to reduce the amount of protrusion of the cup holder 120, and thus, in an exemplary embodiment of the present invention, the flap 128, which elastically rotates to closely support the side of the container 1, is provided in the cup holder 120.

As a result, a sufficient force for supporting the container 1 can be ensured regardless of the diameter or height of the container 1.

The flap 128 is hinge-connected to the inner side of the cup holder 120 to be rotated up and down. Here, a flap spring 129 for elastically rotating the flap 128 is installed in a hinge connection portion (denoted by reference numeral 128a in FIG. 14) of the flap 128 with respect to the cup holder 120.

The elastic restoring force of the flap spring 129 is applied in a direction that the flap 128 is rotated upward to support the container 1 when the cup holder 120 is opened, and thus the flap 128 is automatically rotated upward when the cup holder 120 is pulled backward and opened by the elastic restoring force of the flap spring 129.

Here, the flap 128 is hooked by a hooked portion 127 bent downward at the upper end of the rear portion 122 of the cup holder 120, and thus the upward rotation of the flap 128 is restricted by the hooked portion 127.

Moreover, as shown in FIG. 11, as the flap 128 rotates, the container 1 of various sizes can be received between the container support portion 115 and the flap 128, and the rotated position of the flap 128 varies depending on the size of the received container 1.

When the container 1 is received, the elastic restoring force of the flap spring 129 acts as a force for supporting the container 1. That is, when the container 1 is received, the flap spring 129 is deformed, and the elastic restoring force of the flap spring 129 acts as the force for supporting the container 1 through the flap 128.

In this state, when the container 1 is removed from the cup holder 120, the flap 128 is rotated upward by the elastic restoring force of the flap spring 129 and then hooked by the hooked portion 127 of the cup holder 120.

Then, when the cup holder 120 is pushed into the holder receiving groove 113 of the console box 100 and closed, the flap 128 is pushed downward by the container support portion 115, formed on the inner side of the holder receiving groove 113, automatically rotated downward, and then folded, which will be described in more detail below.

When the container is received, the front end of the flap 128 is in close contact with the side of the container and supports the container. While the cup holder 120 is closed, the front end of the flap 128 is brought into contact with the front side of the container support portion 115, and then the flap 128 is automatically rotated with respect to the hinge connection portion 128a by the contact repulsive force and folded downward.

As such, in order that the flap 128 is automatically folded while the cup holder 120 is closed, the direction of the contact surface of the container support portion 115 and the shape of the front end of the flap 128 should be designed such that the contact repulsive force, which is a force in a direction perpendicular to the contact surface of the container support portion 115 with which the front end of the flap 128 is in contact when the flap 128 is in contact with the container support portion 115, is applied as a rotational moment in a direction that the flap 128 is folded with respect to the hinge connection portion 128a.

Figure 14:
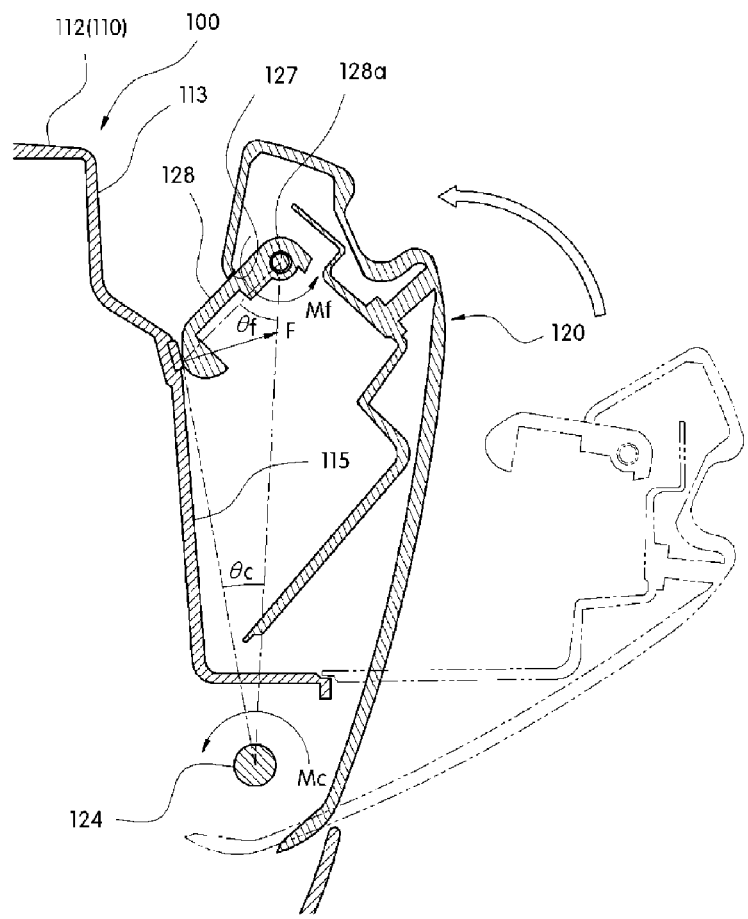
FIG. 14 is a cross-sectional view showing a state in which the flap is automatically folded when the cup holder in accordance with the present invention is closed.
Figure 14:
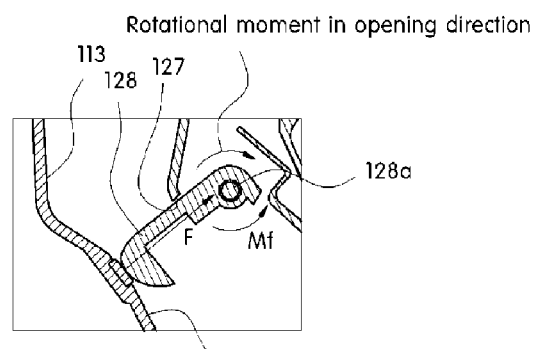
Figure 15:
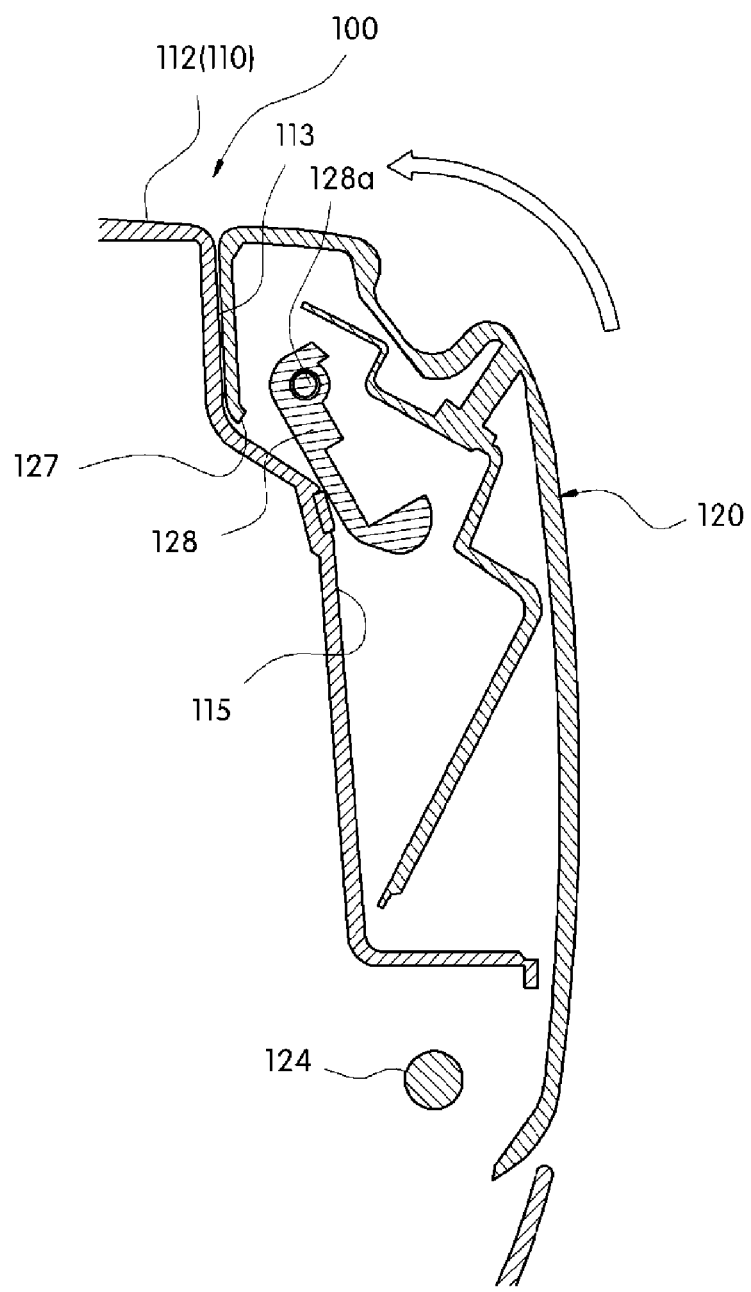
FIG. 15 is a cross-sectional view showing a closed state of the cup holder in accordance with the present invention.

FIG. 14 shows a cross-sectional structure (a) according to an exemplary embodiment of the present invention in which the flap 128 can be automatically folded and a cross-sectional structure (b) according to a comparative example in which the flap 128 cannot be automatically folded. In the structure of (b), the contact repulsive force (F) is applied as a rotational moment in a direction that the flap 128 is opened, and thus the flap 128 cannot be automatically folded. However, in the structure of (a), the contact repulsive force (F) is applied as a rotational moment (Mf) in a direction that the flap 128 is folded, and thus the flap 128 can be automatically folded.

As such, the contact surface of the container support portion 115 and the shape of the front end of the flap 128, which enable the automatic folding, are employed in an exemplary embodiment of the present invention, and thus, when the cup holder 120 is closed, the flap 128 is in contact with the container support portion 115 in the cup holder 120 and then is automatically folded.

Moreover, in employing the flap 128, when the rotational moment (MO in the folding direction of the flap 128 is smaller than a rotational moment (Mc) in the closing direction of the flap 128, the cup holder 120 can be automatically closed.

That is, when the cup holder 120 is closed as the elastic restoring force of the holder spring 126 is applied, if the elastic restoring force of the holder spring 126 is greater than the spring force of the flap spring 129 applied in the opening direction of the cup holder 120 (i.e., in the upward rotating direction of the flap), the cup holder 120 can be automatically closed by the elastic restoring force of the holder spring 126.

In the opposite case, the elastic restoring force of the holder spring 126 cannot overcome the spring force of the flap spring 129, and thus the cup holder 120 cannot be further rotated in the closing direction while the flap 128 is being unfolded and being in contact with the container support portion 115.

Therefore, spring constant Kf of the flap spring 129 and spring constant Kc of the holder spring 126 should satisfy the conditions of the following formula 1.

In FIG. 14, Mc represents the rotational moment in the closing direction of the cup holder 120, Mf represents the rotational moment in the closing direction of the flap 128, θc represents the rotation angle of the cup holder 120 from a state where the flap 128 is initially in contact with the container support portion 115 to a state where the cup holder 120 is completely closed, and θf represents the rotation angle of the flap 128 from a state where the flap 128 is initially in contact with the container support portion 115 to a state where the cup holder 120 is completely closed.

Here, in order that the cup holder 120 is automatically closed, "Mf<Mc" should be satisfied and, to this end, the conditions of the following formula 1 should be satisfied.

$$Kf \times \theta f < Kc \times \theta c \qquad \text{[Formula 1]}$$

As described above, according to the cup holder of the console box for a vehicle of the present invention, in which the both left and right side portions of the cup holder are inserted into the unused spaces of the console box when the cup holder is closed and the flap capable of automatically folded is installed to provide a force for supporting the container, it is possible to ensure a sufficient height for supporting the container (i.e., a sufficient force for supporting the container) and significantly reduce the amount of backward protrusion of the console box and the amount of backward protrusion of the cup holder due to the installation of the cup holder, which contributes to the improvement of the convenience and comfort of the rear seat passenger.

Moreover, the cup holder can be automatically closed and the flap can be automatically folded, which thus facilitates the use of the cup holder.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A console box assembly comprising:
   a console box having a rear housing, the rear housing including a holder receiving groove and left and right recessed portions depressed in a rear portion of the rear housing, the left and right recessed portions positioned adjacent to and extending downwardly form opposing sides of the holder receiving groove;
   a cup holder pivotally mounted to the rear housing and forming a storage space between the cup holder and the rear housing when the cup holder is in an open position, the cup holder including left and right side portions pivotally coupled to the rear portion of the rear housing and an elastic member elastically biasing the cup holder, wherein an upper portion of the cup holder extends into the holder receiving groove and the left and right side portions extend into the left and right recessed portions, respectively, when the cup holder is in a closed position;
   a flap pivotally and elastically coupled to a rear portion of the cup holder and configured for supporting a stored container in the cup holder;
   a flap spring installed on a hinge connection portion connecting the flap to the cup holder to provide an elastic restoring force to the flap for rotating the flap upward with respect to the hinge connection portion;
   a hooked portion formed on the rear portion of the cup holder whereby the flap is hooked to restrict an upward rotation of the flap; and
   a container support portion protruding from the holder receiving groove of the console box and configured for supporting the stored container;
   wherein the flap is automatically folded by the elastic member while a front end of the flap is configured for contact with the container support portion when the cup holder is closed by the elastic member; and
   wherein a direction of a contact surface of the container support portion and the shape of the front end of the flap are designed such that a contact repulsive force, which is a force in a direction perpendicular to the contact surface of the container support portion with which the front end of the flap is in contact when the flap is in contact with the container support portion, is applied as a rotational moment in a direction that the flap is folded in a state where the flap is hooked by the hooked portion on the rear portion of the cup holder.

2. The console box assembly of claim 1, wherein the elastic member provides an elastic restoring force for rotating the cup holder toward a console armrest in a closing direction such that the flap is automatically folded when the cup holder is automatically closed by the elastic restoring force of the elastic member.

3. The console box assembly of claim 2, wherein the following formula is satisfied such that the cup holder is capable of being automatically closed and the flap is automatically folded:

$$Kf \times \theta f < Kc \times \theta c \qquad \text{Formula:}$$

where Kf represents a spring constant of the flap spring, Kc represents a spring constant of the elastic member, θc represents a rotation angle of the cup holder from a state where the flap is initially in contact with the container support portion to a state where the cup holder is completely closed, and θf represents a rotation angle of the flap from the state where the flap is initially in contact with the container support portion to the state where the cup holder is completely closed.

* * * * *